(12) United States Patent
Hoshino et al.

(10) Patent No.: US 7,951,009 B2
(45) Date of Patent: May 31, 2011

(54) FIXED CONSTANT-VELOCITY UNIVERSAL JOINT

(75) Inventors: Manabu Hoshino, Iwata (JP); Teruaki Fujio, Iwata (JP); Tohru Nakagawa, Iwata (JP); Wasaburo Suganuma, Iwata (JP)

(73) Assignee: NTN Corporation, Osaka-shi (JP)

( * ) Notice: Subject to any disclaimer, the term of this patent is extended or adjusted under 35 U.S.C. 154(b) by 394 days.

(21) Appl. No.: 12/224,322

(22) PCT Filed: Mar. 23, 2007

(86) PCT No.: PCT/JP2007/056096
§ 371 (c)(1),
(2), (4) Date: Aug. 25, 2008

(87) PCT Pub. No.: WO2007/111273
PCT Pub. Date: Oct. 4, 2007

(65) Prior Publication Data
US 2009/0054166 A1 Feb. 26, 2009

(30) Foreign Application Priority Data
Mar. 27, 2006 (JP) .................. 2006-086042

(51) Int. Cl.
*F16D 3/224* (2006.01)
(52) U.S. Cl. ..................... 464/145; 464/906
(58) Field of Classification Search .......... 464/140, 464/145, 906
See application file for complete search history.

(56) References Cited

U.S. PATENT DOCUMENTS

| 6,478,683 B1 | 11/2002 | Ouchi et al. |
| 2001/0021671 A1 | 9/2001 | Ouchi et al. |
| 2005/0079918 A1 | 4/2005 | Kobayashi et al. |

FOREIGN PATENT DOCUMENTS

| GB | 1 537 067 | 12/1978 |
| JP | 11-303882 | 11/1999 |
| JP | 2001-153150 | 6/2001 |
| JP | 2005-83408 | 3/2005 |
| JP | 2006-17143 | 1/2006 |

OTHER PUBLICATIONS

Supplemental European Search Report dated May 7, 2010 in corresponding European Application No. 07739537.4.
International Search Report mailed May 15, 2007 for International Application No. PCT/JP2007/056096.

*Primary Examiner* — Greg Binda
(74) *Attorney, Agent, or Firm* — Wenderoth, Lind & Ponack, L.L.P.

(57) ABSTRACT

A fixed constant velocity universal joint is made compact, has little decrease in load capacity even at an operating angle, and can improve high angle strength and durability through lessening instances in which a ball runs over a track at a high angle. A cage includes four pockets, a pair of long pockets of which a circumferential direction spacing is wide and a pair of short pockets of which the circumferential direction spacing is narrow. The long pockets are shifted by 180 degrees along a circumferential direction and the short pockets are shifted by 180 degrees along the circumferential direction. The long pockets and the short pockets are alternately disposed along the circumferential direction. A long pocket houses two balls. A short pocket houses one ball. An offset amount in the cage is made large to be almost the same as an offset amount of track grooves. Track grooves on a joint inner side are deepened and cage thickness on an opening side is increased.

20 Claims, 11 Drawing Sheets

FIXED CONSTANT-VELOCITY UNIVERSAL JOINT

TECHNICAL FIELD

The present invention relates to a fixed constant velocity universal joint and a manufacturing method thereof. Specifically, the present invention relates to a fixed constant velocity universal joint used in a power transmission system in automobiles and various industrial machineries, the fixed constant velocity universal joint allowing only angular displacement between two axes on a driver side and a driven side.

BACKGROUND ART

For example, a fixed constant velocity universal joint is given as a type of constant velocity universal joint used as a means for transmitting rotational force from an automobile engine to wheels at a constant speed. The fixed constant velocity universal joint has a configuration allowing rotational torque to be transmitted at a constant speed even when two axes on a driver side and on a driven side are connected and the two axes are at an operating angle. In general, a barfield type (BJ) and an undercut-free type (UJ) are widely known as the fixed constant velocity universal joint described above.

For example, the UJ-type fixed constant velocity universal joint includes an outer ring 3, an inner ring 6, a plurality of balls 7, and a cage 8. The outer ring 3 serves as an outward component on which a plurality of track grooves 2 are formed on an inner spherical surface 1 along an axial direction, evenly spaced in a circumferential direction, as shown in FIG. 6 and FIG. 7. The inner ring 6 serves as an inward component in which a plurality of track grooves 5 paired with the track grooves 2 of the outer ring 3 are formed on an outer spherical surface 4 along an axial direction, evenly spaced in a circumferential direction. The balls 7 are interposed between the track grooves 2 of the outer ring 3 and the track grooves 5 of the inner ring 6 and transmit torque. The cage 8 is interposed between the inner spherical surface 1 of the outer ring 3 and the outer spherical surface 4 of the inner ring 6 and holds the balls 7. A plurality of pockets 9 housing the balls 7 are disposed in the cage 8 along the circumferential direction.

A track groove 2 on the outer ring 3 is composed of an inner side track groove 2a and an opening side track groove 2b. The inner side track groove 2a has a track groove bottom that is an arc section. The opening side track groove 2b has a track groove bottom that is a straight section parallel with an outer ring axial line. A center of curvature O1 of the inner side track groove 2a is shifted in an axial direction, from a joint center O towards an opening side of the outer ring 3. A track groove 5 on the inner ring 6 is composed of an inner side track groove 5a and an opening side track groove 5b. The inner side track groove 5a has a track groove bottom that is a straight section parallel to an inner ring axial line. The opening side track groove 5b has a track groove bottom that is an arc section. A center of curvature O2 of the opening track groove 5b is provided separated from the joint center O in an axial direction by an equal distance k in an inward direction on a side opposite of the center of curvature O1 of the inner track groove 2a on the outer ring 3.

A center of curvature O3 of a cage outer spherical surface 8a is shifted in an axial direction, from the joint center O to an opening side of the cage 8. A center of curvature O4 of a cage inner spherical surface 8b is provided separated from the joint center O in the axial direction by an equal distance k1 in an inward direction on a side opposite of the center of curvature O3 of the cage outer spherical surface 8a. Conventionally, in this type of constant velocity universal joint, track offset amounts in the inner and outer rings are large and an offset amount in the cage is small. A pitch angle of two adjacent balls 7 is 60 degrees. In other words, six balls 7 are disposed along the circumferential direction at a pitch of 60 degrees.

In recent years, it is demanded that the fixed velocity universal joint be made compact and have increased torque load capacity. As a method of reducing the size and increasing the torque load capacity of the fixed constant velocity universal gear having six balls, balls that are as large as possible being disposed on a PCD that is as small as possible can be considered. However, when large balls are used, columns (window columns) between the pockets in the cage become narrow. Rigidity of the cage deteriorates. Regarding torsional torque at a high angle in particular, damage to the cage more easily occurs, contributing to deterioration of strength of the constant velocity universal joint.

In particular, as shown in FIG. 6, when the track offset amounts in the inner and outer rings are large and the offset amount in the cage is small, a track groove depth on an outer ring inner side becomes shallow, and the torque load capacity at a high angle decreases. In other words, the ball easily runs over a track edge in relation to the torque load at a high angle, generating excessive stress in an edge section. Therefore, damage caused by a chip in the edge section and a locking phenomenon with the cage caused by plastic deformation occur. Such damage and locking phenomenon contributing to cage damage by degrading workability and reducing durability life. Moreover, a track depth on an inner side becomes shallow in the inner ring as well, and disadvantages similar to those of the outer ring occur. Therefore, improvement of joint strength and durability at a high angle range has been an issue since the past.

Conventionally, durability of an overall constant velocity universal joint is achieved through securement of cage durability being achieved by an increase in a circumferential direction length dimension of a column section present between pockets adjacent in a circumferential direction (Patent Document 1). In other words, in an invention described in Patent Document 1, space between balls housed within a same pocket is reduced by a plurality of balls being housed in a single pocket. As a result, the circumferential direction length dimension of the column section present between the pockets adjacent in the circumferential direction is increased. The number of balls is seven or more.

Conventionally, there is a fixed constant velocity universal joint in which two balls are housed in each pocket in the cage, and periodic change in moment during rotation is controlled (Patent Document 2). In other words, in an invention described in Patent Document 2, a circumferential direction length of a single window column is increased with all pockets in the cage serving as a long window with wide circumferential direction spacing between the pockets.

Patent Document 1: Japanese Patent Laid-open Publication No. Heisei 11-303882
Patent Document 2: United Kingdom Patent No. 1537067

SUMMARY OF THE INVENTION

Problems to be Solved by the Invention

In the constant velocity universal joint configured as shown in FIG. 6, when the inner ring 6 is mounted on the cage 8, a following method is generally used. In a state in which the inner ring 6 is disposed such that an axial line of the inner ring 6 is perpendicular to an axial line of the cage 8 (a state in which the inner ring 6 is rotated 90° to the cage 8), a portion of the outer spherical surface 4 of the inner ring 6 is dropped into a pocket 9 of the cage 8. In this state, the inner ring 6 is inserted into the cage 8. The inner ring 6 is then rotated 90° to the cage 8. The axial line of the inner ring 6 is aligned with the axial line of the cage 8, and the inner ring 6 is disposed in a normal position.

Therefore, to facilitate insertion of the inner ring 6 into the cage 8, a notched section 11 having a rectangular cross-section is provided on the outer spherical surface 4 of the inner ring 6, as shown in FIG. 8. Alternatively, a notched section (chamfer) 12 having a triangular cross-section is provided on the outer spherical surface 4 of the inner ring 6, as shown in FIG. 9. Furthermore, the pockets 9 with ordinary circumferential direction spacing b and long windows (long pockets) 13 with a circumferential direction spacing wider than the ordinary pockets 9 are provided, as shown in FIG. 10. Alternatively, an inlay diameter 14 for inner ring-mounting is provided on an inner surface of one entrance section of the cage 8 and a diameter of the entrance section is required to be widened, as shown in FIG. 11.

In the outer ring 3, to improve mountability of the cage 8 to the outer ring 3, the cage 8 to which the inner ring 6 is mounted, a chamfer 15 may be formed on an entrance section of the outer ring 3, as shown in FIG. 12.

However, as shown in FIG. 8, when the notched section 11 is provided, an inner ring load capacity at a high angle decreases and contact surface pressure between the inner ring and a cage inner spherical surface increases. The contact surface pressure between the inner ring and the cage inner spherical surface also increases with the chamfer 12 shown in FIG. 9. When the long windows 13 such as those shown in FIG. 10 are provided, cage window columns become narrow, causing deterioration of cage strength. Moreover, when the inlay diameter 14 for inner ring-mounting is provided on the inner surface of one entrance section as shown in FIG. 11, strength of the entrance section deteriorates and the contact surface pressure between the inner ring and the cage inner spherical surface increases.

In the invention described in Patent Document 1, the circumferential direction length dimension of the column section present between the pockets adjacent in the circumferential direction is increased by a plurality of balls being housed in the pocket. As a result, improvement of durability of the overall constant velocity universal joint is achieved through securement of cage durability being achieved. However, in the invention described in Patent Document 1, it is presumed that seven or more balls are provided. Prevention of the decrease in load capacity at a high angle, the increase in the contact surface pressure between the inner ring and the cage inner spherical surface, and the like cannot be achieved when six balls are provided.

In the invention described in Patent Document 2, two are housed in each pocket of the cage. As in Patent Document 1, the circumferential direction length of the window column is increased through decrease of the number of overall pockets. Therefore, in this instance as well, prevention of the decrease in load capacity at a high angle, the increase in the contact surface pressure between the inner ring and the cage inner spherical surface, and the like cannot be achieved.

In light of the above-described issues, the present invention provides a fixed constant velocity universal joint that can be made compact, has little decrease in load capacity even when the fixed constant velocity universal joint is made compact and is at an operating angle, and can improve high angle strength and durability through lessening instances in which a ball runs over a track at a high angle.

Means for Solving the Problems

A fixed constant velocity universal joint of the present invention is a fixed constant velocity universal joint including an outward component on which a plurality of track grooves are formed on an inner spherical surface, an inward component on which a plurality of track grooves are formed on an outer spherical surface, a plurality of balls that are interposed between the track grooves of the outward component and the track grooves of the inward component and transmit torque, and a cage that has pockets housing the balls and is interposed between the outward component and the inward component. In the fixed constant velocity universal joint, the cage has four pockets that are a pair of long pockets of which a circumferential direction spacing is wide and a pair of short pockets of which a circumferential direction spacing is narrow. The pair of long pockets are shifted by 180 degrees along a circumferential direction, and the pair of short pockets are shifted by 180 degrees along the circumferential direction. The long pockets and the short pockets are alternately disposed along the circumferential direction. A long pocket houses two balls, and a short pocket houses one ball.

In the fixed constant velocity universal joint of the present invention, window columns between the pockets in the cage can be four. A circumferential direction length of a single window column can be long. As a result, rigidity of each cage window column can be increased. In addition, as a result of the long pockets being provided, mounting of the inner ring to the cage can be facilitated.

A pitch angle on a PCD of the two balls housed in the long pocket is less than 60 degrees and a pitch angle of other balls is greater than 60 degrees. As a result, an inter-pitch distance of the two balls housed in the long pocket is shortened. An inter-pitch distance of corresponding track grooves on the outward component can be shortened.

An axial direction length of the inward component is shorter than a circumferential direction spacing of the long pockets. As a result, the mounting of the inner component to the cage can be further facilitated. Moreover, a shoulder width dimension between two track grooves on the outward component corresponding with the long pockets of the cage is set smaller than a pocket width in a cage axial direction. As a result, mounting of the cage to the outer ring can be facilitated.

A center of curvature of the track groove on the outward component and a center of curvature of the track groove on the inward component are offset from a joint center in opposite axial directions by an equal distance. A center of curvature of the outer spherical surface of the cage and a center of curvature of the inner spherical surface of the cage are offset from a joint center in opposite axial directions by an equal distance. An offset amount in the cage is made large so as to be almost the same as an offset amount in the track grooves. As a result, a track groove depth on a joint inner side can be prevented from becoming shallow and a thickness of the cage on the opening side (radial direction thickness) can be increased.

As the fixed constant velocity universal joint, track groove bottoms on the inward component and on the outward component can include an arc section and a straight section. Alternatively, the track groove bottoms on the inward component and on the outward component can include an arc section and a tapered section.

Advantage of the Invention

In the present invention, the rigidity of each cage window column can be increased. Therefore, large balls can be disposed on a small PCD. Size reduction can be achieved without decrease in load capacity. Moreover, damage to the cage can be prevented in relation to a torsional torque load at a high angle. As a result of the long pockets being provided, the mounting of the inner ring to the cage can be facilitated. In particular, as a result of the axial direction length of the inner ring being shorter than a shortest length of the circumferential direction spacing of the long pockets, the mounting of the inner ring to the cage can be further facilitated, and mounting operability can be improved.

The inter-pitch distance of the two balls housed in the long pocket can be shortened and the inter-pitch distance of the corresponding track grooves on the outward component can be shortened. As a result, the mounting of the cage to the outer ring can be facilitated. In particular, the inter-pitch distance (inter-track-groove shoulder width dimension) can be made shorter than the pocket width in the cage axial direction. As a result, the mounting of the cage to the outer ring can be further facilitated, and mounting operability can be improved.

The offset amount in the cage is made large to become almost the same as the offset amount in the track grooves. Therefore, the track groove depth on the joint inner side can be prevented from becoming shallow. In addition, the thickness of the cage on the opening side (radial direction thickness) can be increased. As a result, the balls can be prevented from running over a track edge at a high angle, and excessive stress is not placed on the edge. In other words, decrease in torsional torque load capacity at a high angle is prevented. Improvement (modification) in high angle durability life and improvement (modification) of damage strength caused by plastic deformation of the track grooves on the inward component and on the outward component at a high angle can be achieved.

The thickness of the cage on the joint opening side (radial direction thickness) can be increased. Therefore, rigidity of the cage window frames on the joint opening side can be increased. As a result, in combination with the rigidity of each cage window frame increasing, significant improvement in cage damage strength in relation to the torsional torque load at a high angle can be achieved.

When two balls are housed in the long pocket, a window column is not present between the balls. Therefore, the rigidity of the window frames on the joint opening side receiving a large load from the balls is required to be increased. However, as described above, as a result of the offset amount in the cage being made large to become almost the same as the offset amount in the track grooves, the rigidity of the window frames on the joint opening side can be increased. A sufficient cage strength can be maintained even in a configuration in which the long pocket houses two balls.

DETAILED DESCRIPTION OF THE INVENTION

A fixed constant velocity universal joint according to an embodiment of the present invention will be described with reference to FIG. 1 to FIG. 5.

Figure 1:
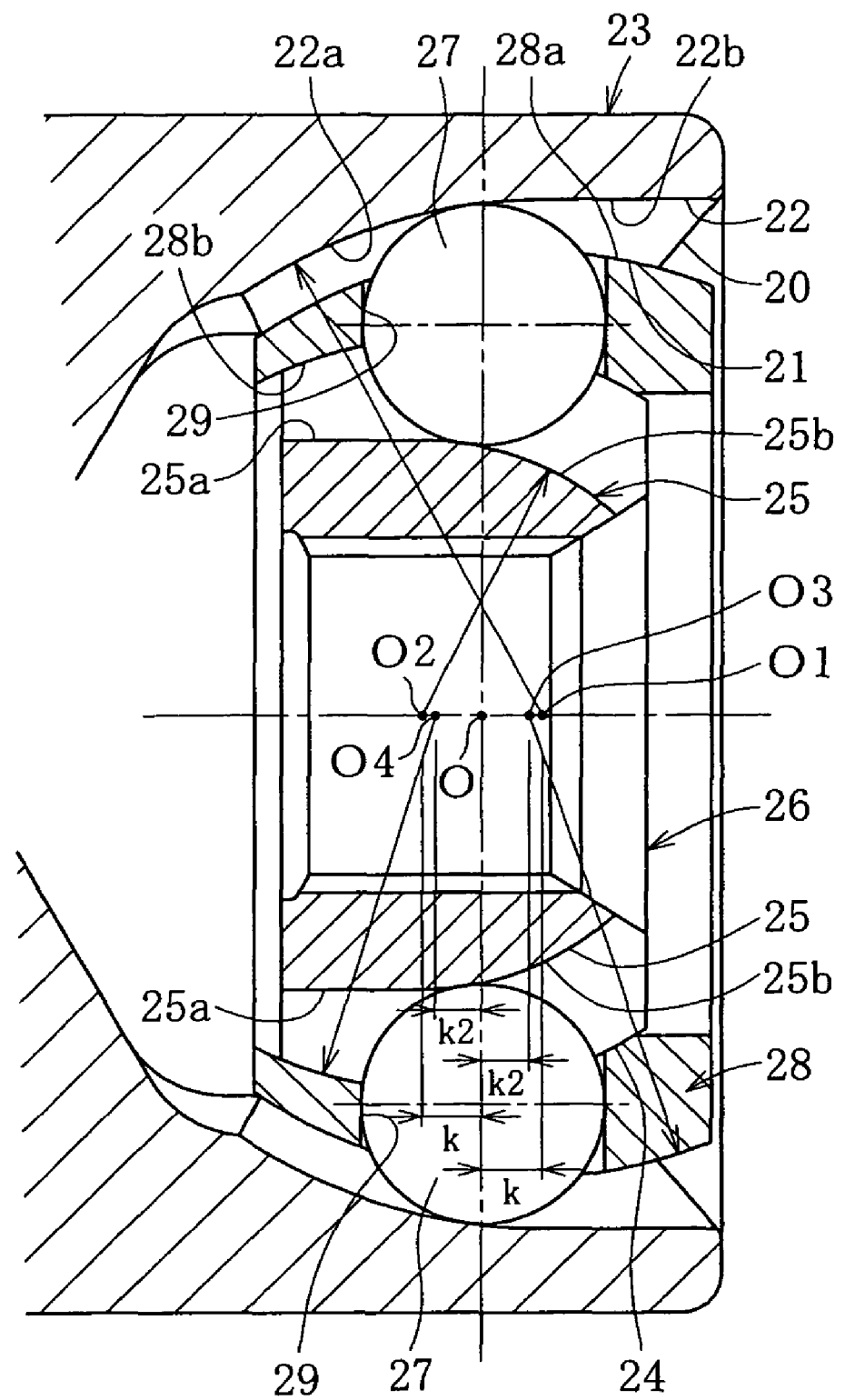
FIG. 1 is a vertical cross-sectional view of a fixed constant velocity universal joint according to an embodiment of the present invention.

As shown in FIG. 1, the fixed constant velocity universal joint includes an outer ring 23, an inner ring 26, a plurality of balls 27, and a cage 28. The outer ring 23 serves as an outward component in which a plurality of track grooves 22 are formed on an inner spherical surface 21 along an axial direction, unevenly spaced in a circumferential direction. The inner ring 26 serves as an inward component in which a plurality of track grooves 25 paired with the track grooves 22 on the outer ring 23 are formed on an outer spherical surface 24 along an axial direction, unevenly spaced in a circumferential direction. The balls 27 are interposed between the track grooves 22 of the outer ring 23 and the track grooves 25 of the inner ring 26 and transmit torque. The cage 28 is interposed between the inner spherical surface 21 of the outer ring 23 and the outer spherical surface 24 of the inner ring 26 and holds the balls 27.

A track groove 22 on the outer ring 23 is composed of an inner side track groove 22a and an opening side track groove 22b. The inner side track groove 22a has a track groove bottom that is an arc section. The opening side track groove 22b has a track groove bottom that is a straight section parallel with an outer ring axial line. A center of curvature O1 of the inner side track groove 22a is shifted in an axial direction, from a joint center O towards an opening side of the outer ring 23. A track groove 25 on the inner ring 26 is composed of an inner side track groove 25a and an opening side track groove 25b. The inner side track groove 25a has a track groove bottom that is a straight section parallel to an inner ring axial line. The opening side track groove 25b has a track groove bottom that is an arc section. A center of curvature O2 of the opening track groove 25b is provided separated from the joint center O in an axial direction by an equal distance k in an inward direction on a side opposite of the center of curvature O1 of the inner track groove 22a of the outer ring 23

In the cage 28, a center of curvature O3 of an outer spherical surface 28a and a center of curvature O4 of an inner spherical surface 28b are offset in opposite axial directions from the joint center (cage center) O by an equal distance k2. An offset amount in the cage 28 is made large to be almost the same as an offset in the track grooves.

Therefore, the outer spherical surface 28a of the cage 28 can form an arc (concentric arc having a different curvature radius) that is almost concentric with the groove bottom of the inner side track groove 22a in the outer ring 23. Track groove depth at a joint inner side can be prevented from becoming shallow. In addition, a thickness of the cage 28 on an opening side (radial direction thickness) can be increased.

Figure 2:
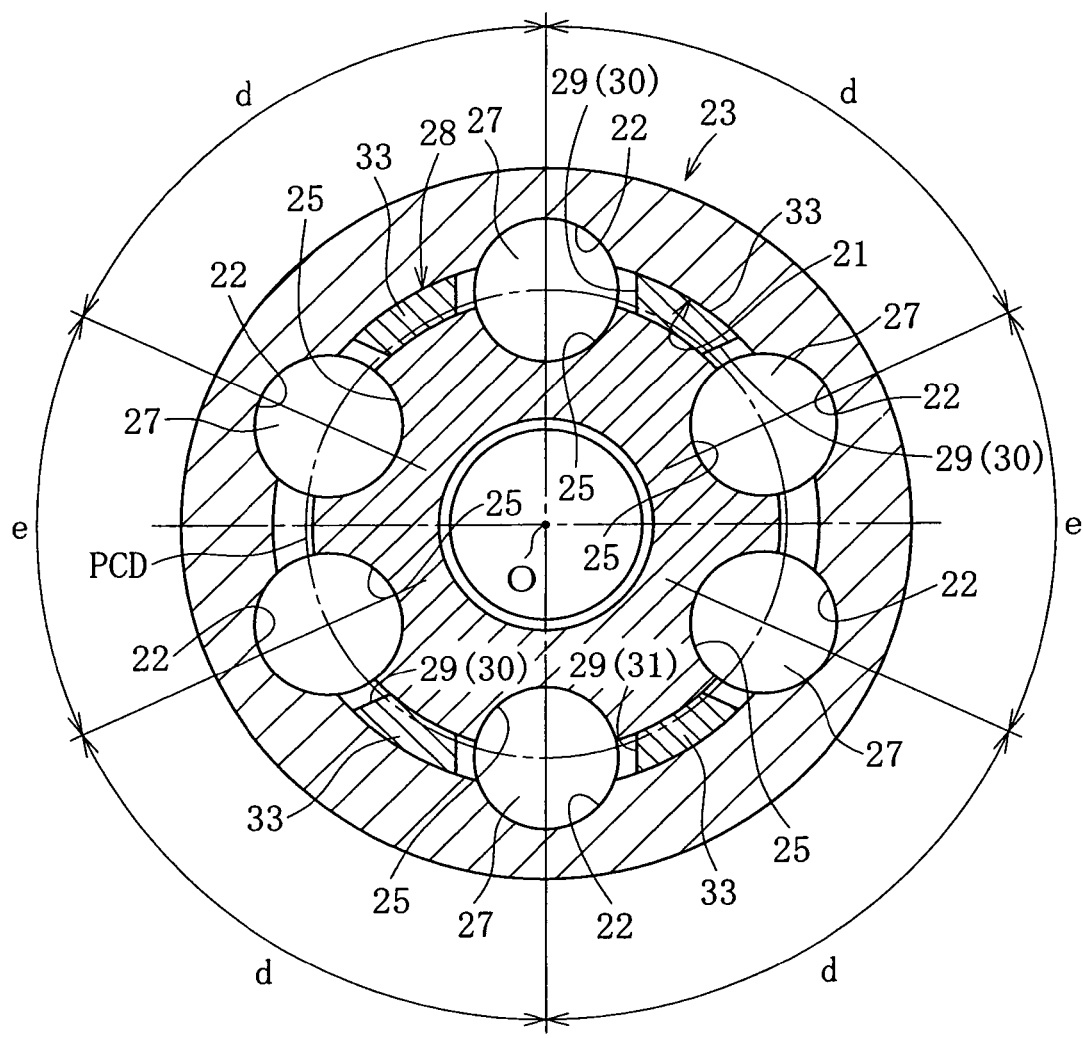
FIG. 2 is a horizontal cross-sectional view of the fixed constant velocity universal joint.
Figure 3:
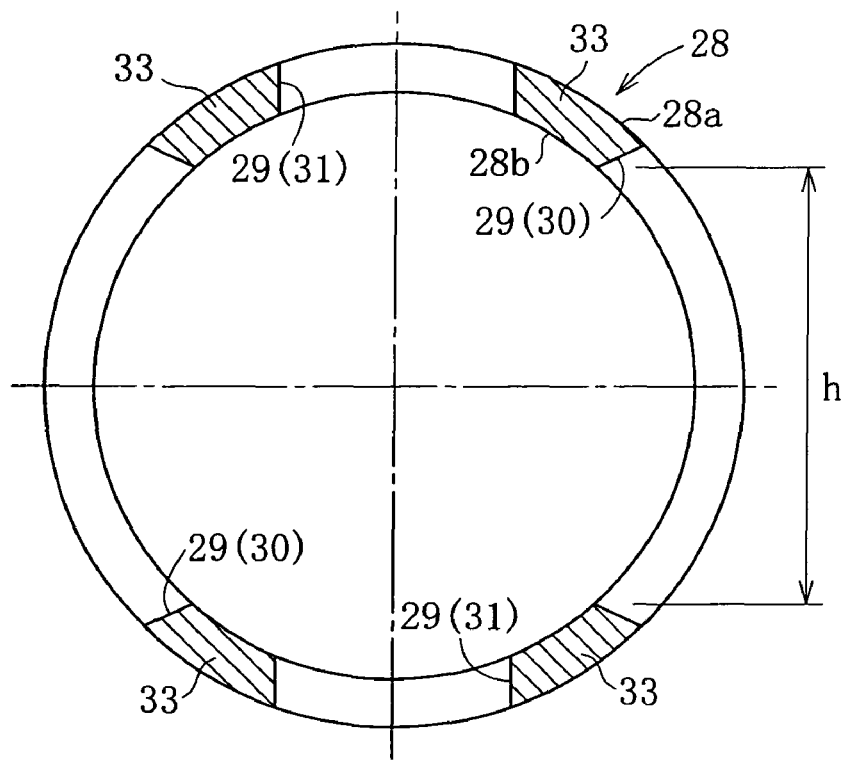
FIG. 3 is a cross-sectional view of a cage in the fixed constant velocity universal joint.
Figure 4:
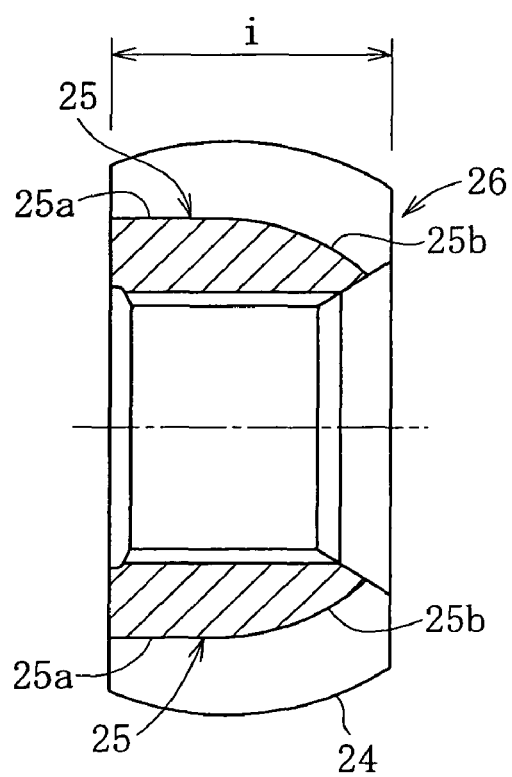
FIG. 4 is a cross-sectional view of an inner ring in the fixed constant velocity universal joint.

Pockets 9 for housing the balls 27 are provided in the cage 28. In this case, as shown in FIG. 2 and FIG. 3, four pockets 29 are provided in the cage 28, a pair of long pockets 30 of which circumferential direction spacing is wide and a pair of short pockets 31 of which circumferential direction spacing is narrow. The pair of long pockets 30 are shifted by 180 degrees along the circumferential direction, and the pair of short pockets 31 are shifted by 180 degrees along the circumferential direction. The long pockets 30 and the short pockets 31 are alternately disposed along the circumferential direction. Therefore, there are four window columns (cage window columns) that are provided between the pockets. A long pocket 30 stores two balls 27, and a short pocket 31 stores one ball 27.

Figure 5:
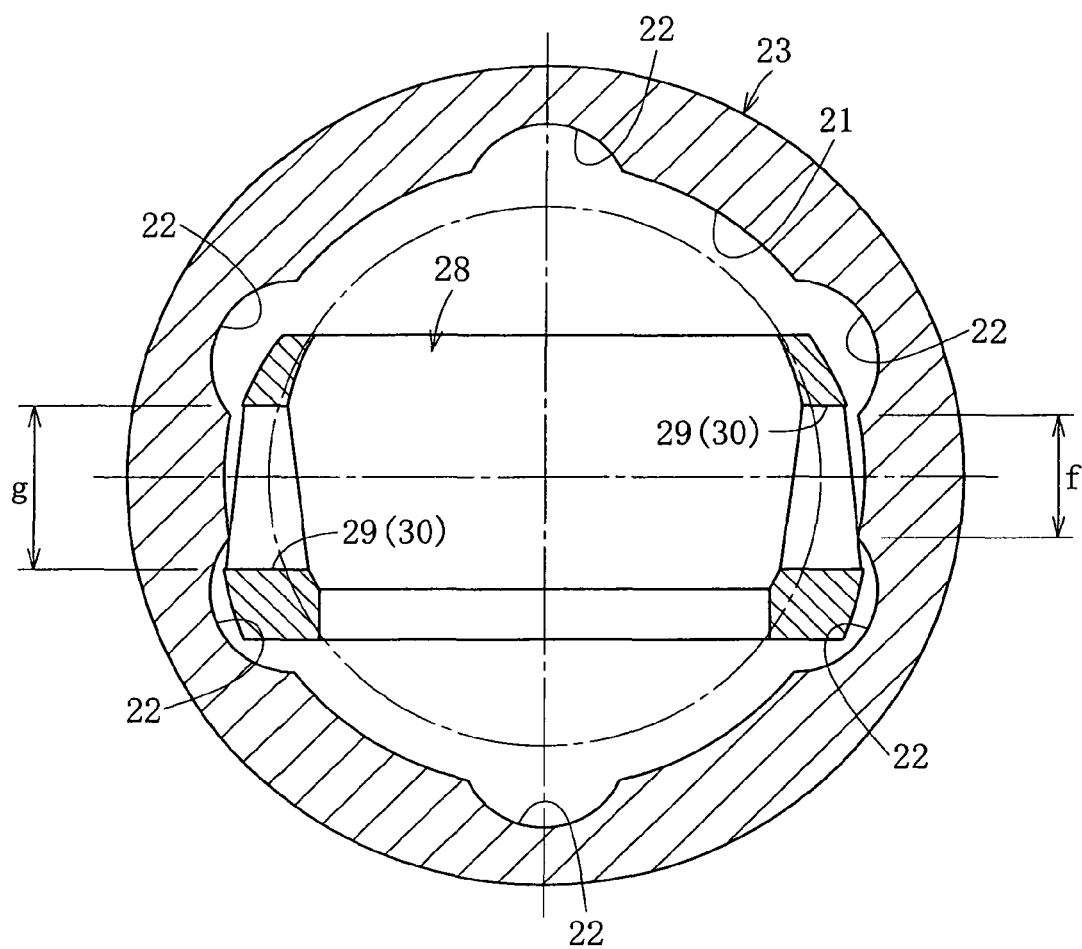
FIG. 5 is a cross-sectional view of a state in which the cage is mounted to an outer ring.

A pitch angle e on a pitch circle diameter PCD of the two balls 27 housed in the long pocket 30 is less than 60 degrees. In addition, a pitch angle d of other balls 27 is greater than 60 degrees. An axial direction length i (see FIG. 4) of the inner ring 26 is shorter than a circumferential direction spacing h (see FIG. 3) of the long pockets 30. Furthermore, as shown in FIG. 5, a shoulder width f between two track grooves in the outer ring 23 corresponding to the long pockets 30 in the cage 28 are set to be shorter than a pocket width g in a cage axial direction.

In the fixed constant velocity universal joint of the present invention, a number of window columns 33 between the pockets in the cage 28 can be four. A circumferential direction length of a single window column 33 can be long. Therefore, rigidity of each cage window column 33 can be increased. As a result, the large balls 27 can be disposed in a small PCD. Size reduction can be achieved for a fixed constant velocity universal joint that can be made compact without reducing load capacity. Moreover, damage to the cage 28 in relation to torsional torque at a high angle can be prevented.

As a result of the long pockets 30 being provided, mounting of the inner ring 26 to the cage 28 can be facilitated. In particular, as a result of the axial direction length I of the inner ring 26 being shorter than the circumferential direction spacing h of the long pockets 30, the mounting of the inner ring 26 to the cage 28 can be further facilitated. Mounting operability can be improved.

In other words, when the inner ring 26 is mounted to the cage 28, in a state in which the inner ring 26 is disposed such that an axial line of the inner ring 26 is perpendicular to an axial line of the cage 28 (a state in which the inner ring 26 is rotated 90° to the cage 28), a portion of the outer spherical surface 24 of the inner ring 26 is dropped into a pocket 29 of the cage 28. In this state, the inner ring 26 is inserted into the cage 28. The inner ring 28 is then rotated 90° to the cage 28. The axial line of the inner ring 26 is aligned with the axial line of the cage 28, and the inner ring 6 is disposed in a normal position. Therefore, when the inner ring 26 is mounted to the cage 28, a portion of the outer spherical surface 24 of the inner ring 26 can be dropped into the long pocket 30, and mounting of the inner ring 26 to the cage can be facilitated.

In addition, an inter-pitch distance of the two balls 27 housed in the long pocket 30 can be shortened and an inter-pitch distance of the corresponding track grooves 22 on the outer ring 23 can be shortened. As a result, mounting of the cage 28 to the outer ring 23 can be facilitated. In particular, the inter-pitch distance (track shoulder width dimension f) can be made smaller than the pocket width g in the cage axial direction. As a result, the mounting of the cage 28 to the outer ring 23 can be further facilitated, and mounting operability can be improved.

The offset amount in the cage 28 is made large to become almost the same as the offset amounts in the track grooves 22 and 25. Therefore, the track groove depth on the joint inner side can be prevented from becoming shallow, and the thickness of the cage 28 on the opening side (radial direction thickness) can be increased. As a result, the balls can be prevented from running over a track edge at a high angle, and excessive stress is not placed on the edge. In other words, decrease in torsional torque load capacity at a high angle can be prevented. An improvement in high angle durability life and an improvement (modification) in damage strength caused by plastic deformation of the track grooves in the inward component and the outward component at a high angle can be achieved.

The thickness (radial direction thickness) of the cage 28 on the joint opening side can be increased. Therefore, rigidity of a cage window frame on the joint opening side can be increased. As a result, in combination with the rigidity of each cage window column increasing, significant improvement in cage damage strength in relation to torsional torque at a high angle can be achieved.

When two balls 27 are housed in the long pocket 30, the window column 33 is not present between the balls. Therefore, the rigidity of the window frame on the joint opening side receiving a large load from the balls 27 is required to be increased. However, as described above, because the offset amount in the cage 28 is increased to be almost the same as the offset amounts in the track grooves 22 and 25, the rigidity of the window frame on the joint opening side can be increased. Strength of the cage 28 can be sufficiently maintained, even in a configuration in which two balls 27 are housed in the long pocket 30.

Figure 14:
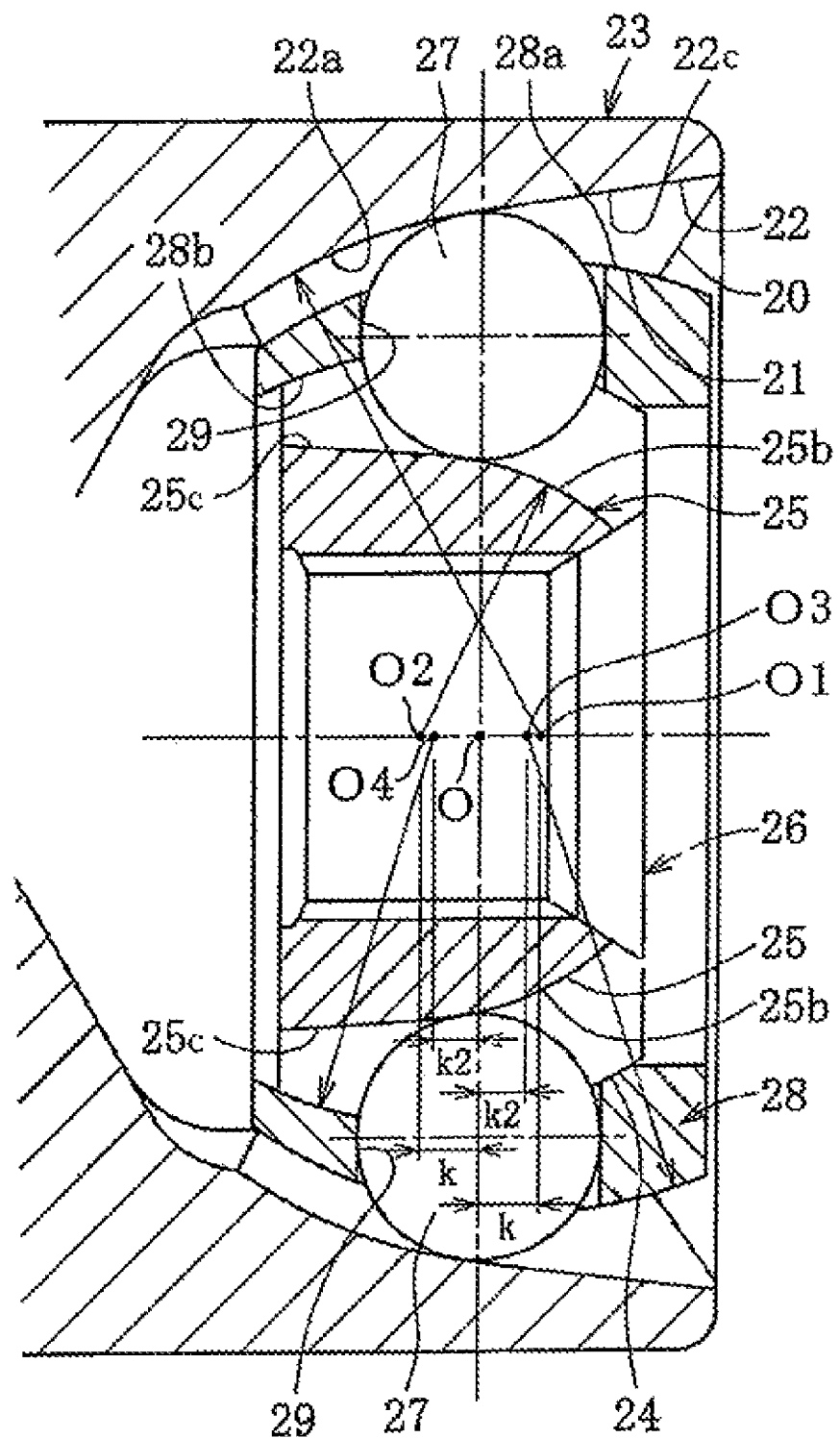
FIG. 14 is a vertical cross-sectional view of a fixed constant velocity universal joint according to a modified embodiment of the present invention.

According to the above-described embodiment, an undercut-free type (UJ) including the straight grooves 22b and 25b in the track grooves 22 and 25 is given as the fixed constant velocity universal joint. However, the fixed constant velocity universal joint can also be a barfield type (BJ) that does not have straight grooves such as these. The track groove bottoms in the inner ring 26 and the outer ring 23 can also have an arc section 25b, 22a and a tapered section 25c, 22c as illustrated in FIG. 14. In this case, the tapered section of the track groove 22 on the outer ring 23 is preferably provided on the opening side and expands from the inner side towards the opening side. This is to allow a large operating angle.

Figure 6:
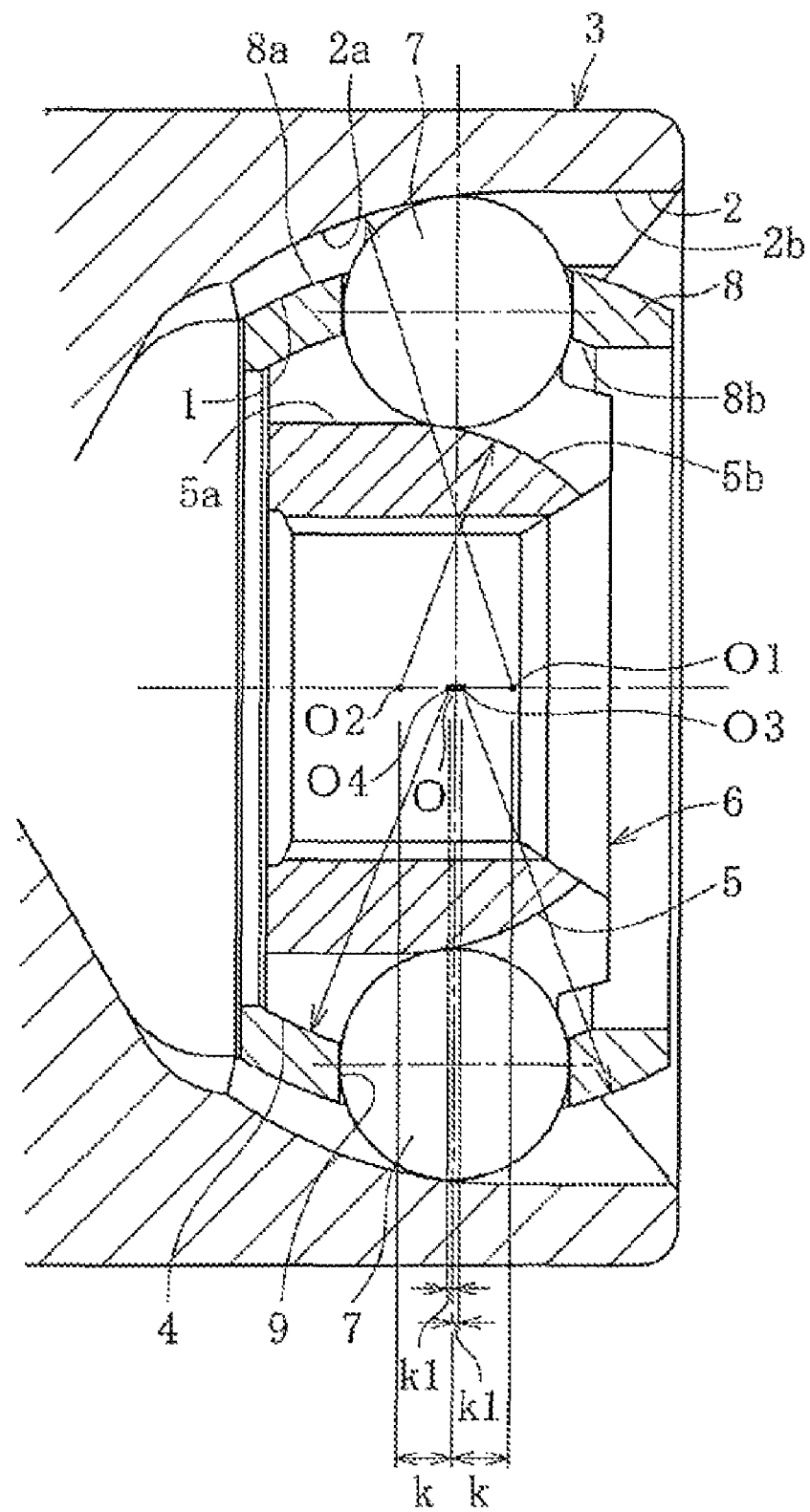
FIG. 6 is a vertical cross-sectional view of a conventional fixed constant velocity universal joint.
Figure 7:
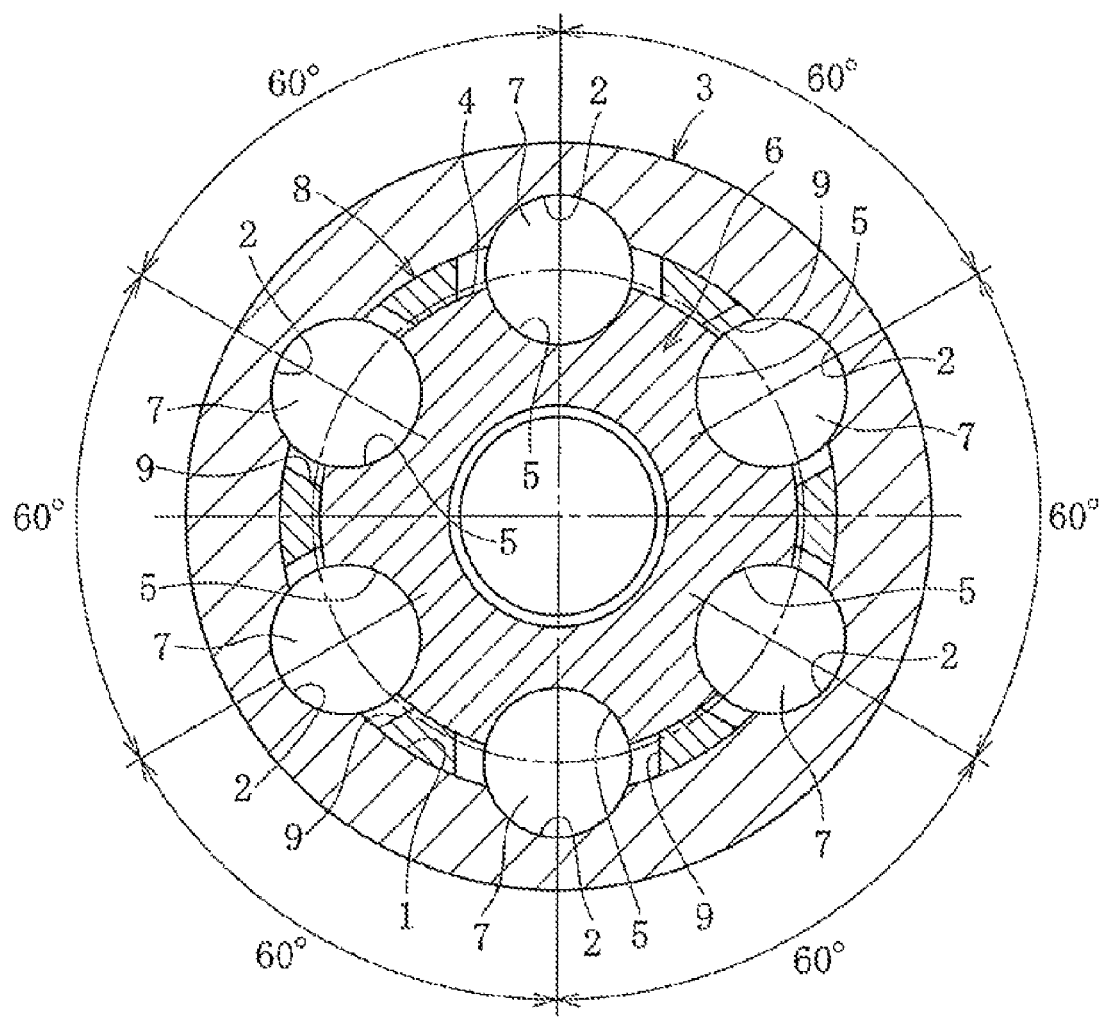
FIG. 7 is a horizontal cross-sectional view of the fixed constant velocity universal joint.
Figure 8:
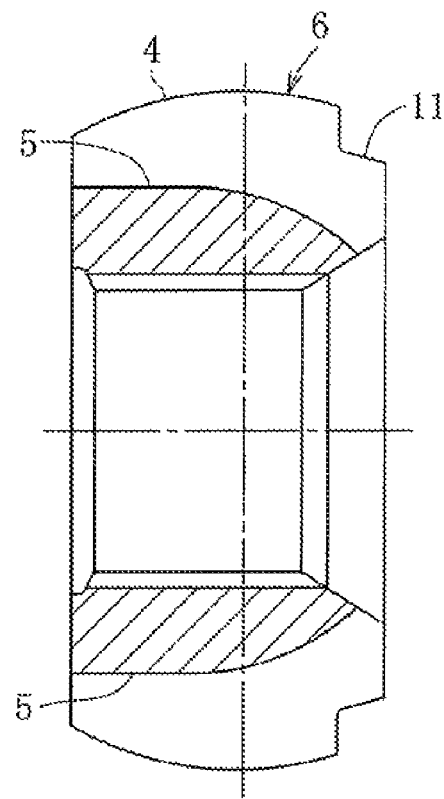
FIG. 8 is a cross-sectional view of an inner ring.
Figure 9:
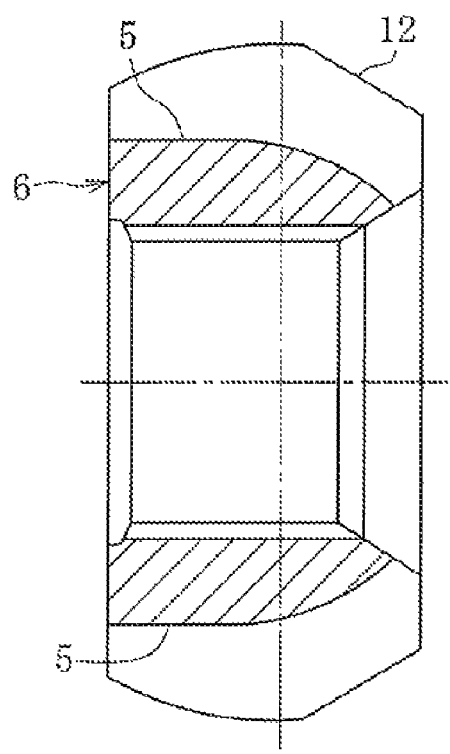
FIG. 9 is a cross-sectional view of another inner ring.
Figure 10:
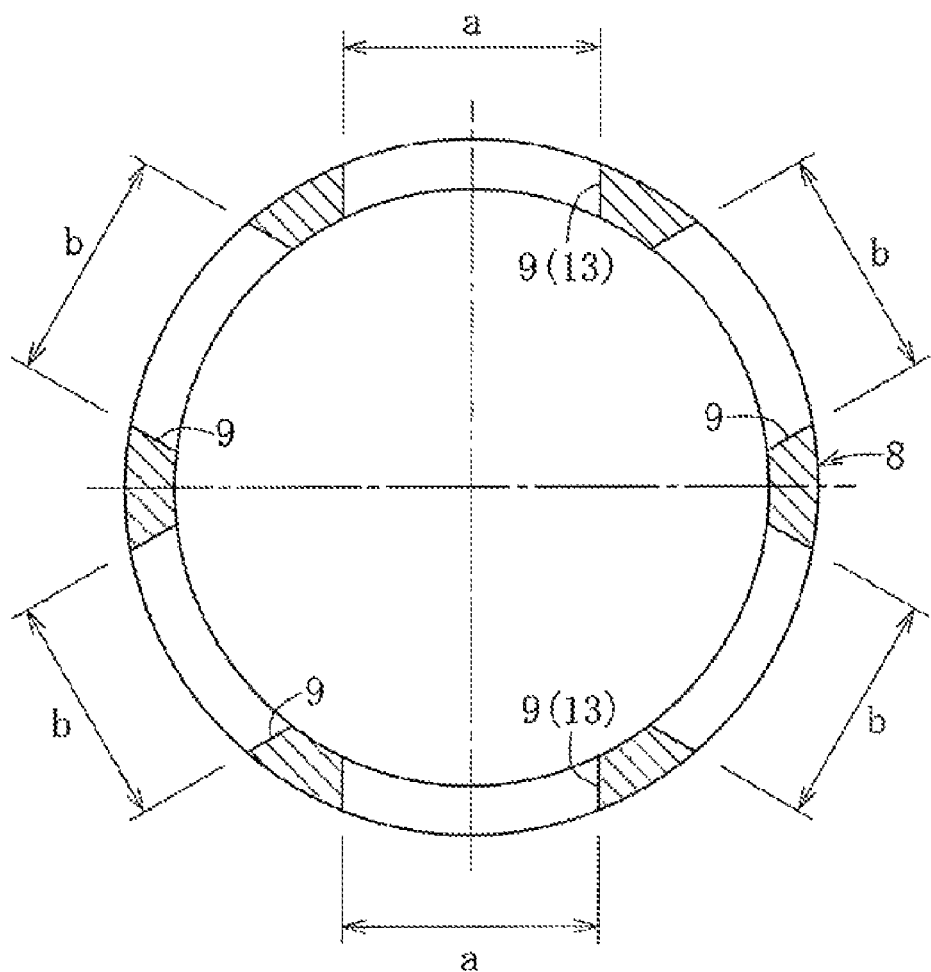
FIG. 10 is a horizontal cross-sectional view of a conventional cage.
Figure 11:
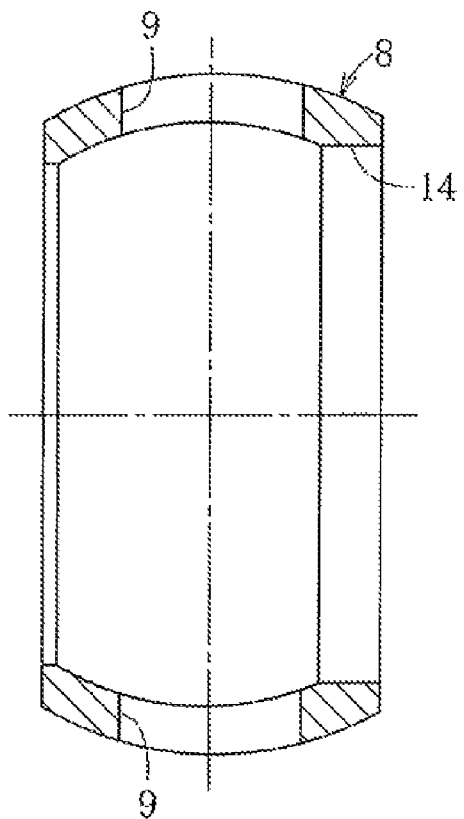
FIG. 11 is a vertical cross-sectional view of the conventional cage.
Figure 12:
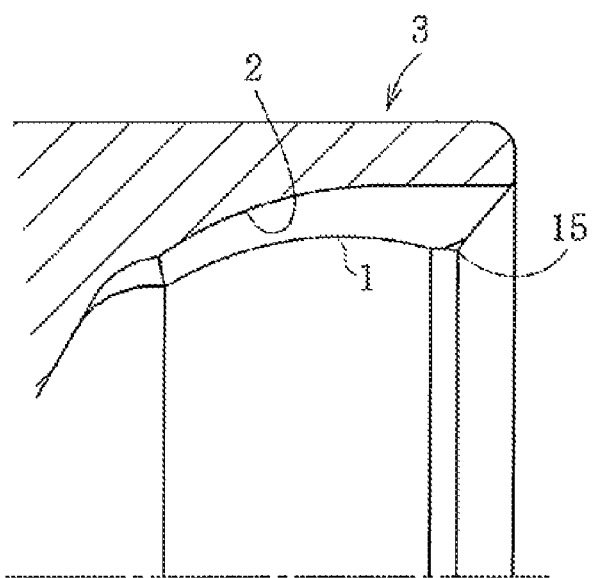
FIG. 12 is a cross-sectional view of main components in a conventional outer ring.
Figure 13:
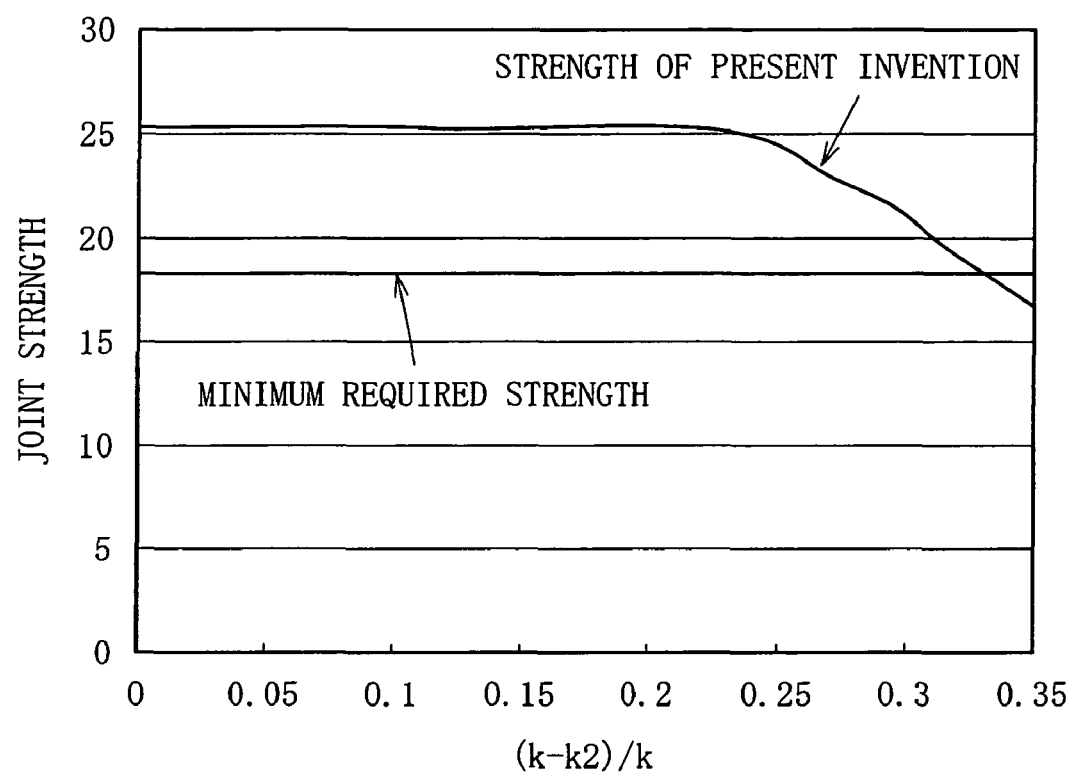
FIG. 13 is a diagram of a relationship between an offset amount k and a shifting amount (k-k2).

The embodiment of the present invention has been described above. However, the present invention is not limited to the embodiment. Various modifications can be made. For example, according to the above-described embodiment, the center of curvature O1 and the center of curvature O2 are disposed in slightly shifted positions. The center of curvature O3 and the center of curvature O4 are disposed in slightly shifted positions. However, the center of curvature O1 and the center of curvature O2 can be disposed in the same position. The center of curvature O3 and the center of curvature O4 can be disposed in the same position. In addition, when the center of curvature O1 and the center of curvature O3 are shifted, or when e center of curvature O2 and the center of curvature O4 are shifted, the shifting amount can be arbitrarily set. However, a proportion of the offset amount and the shifting amount (k-k2) is preferably set to be $(k-k2)/k \leq 0.3$. When $(k-k2)/k > 0.3$, there is no difference from the conventional fixed constant velocity universal joint shown in FIG. 6. The track groove depth on the joint inner side becomes shallow, and the thickness of the cage 28 on the opening side cannot be increased. Strength of the joint becomes less than a required strength (FIG. 13).

Moreover, the circumferential direction spacing h of the long pockets 30 can be variably set within a range in which improvement in the mountability of the inner ring 26 to the cage 28 can be achieved and the rigidity of the window columns 33 does not decrease. Furthermore, the shoulder width dimension f between track grooves, the pocket width g in the cage axial direction of the cage 28, and the like can be set taking into consideration mountability of the cage 28 to the outer ring 23.

The invention claimed is:

1. A fixed constant velocity universal joint comprising:
   an outward component having an inner spherical surface on which a plurality of track grooves are formed;
   an inward component having an outer spherical surface on which a plurality of track grooves are formed;
   a plurality of balls for transmitting torque that are interposed between the track grooves of the outward component and the track grooves of the inward component; and
   a cage interposed between the outward component and the inward component, the cage having pockets housing the balls, wherein
   the cage has four pockets including a pair of long pockets and a pair of short pockets, a circumferential direction spacing of the long pockets is wider than a circumferential direction spacing of the short pockets, the pair of long pockets are shifted by 180 degrees along a circumferential direction and the pair of short pockets are shifted by 180 degrees along the circumferential direction, the long pockets and the short pockets are alternately disposed along the circumferential direction, and each of the long pockets houses two balls and each of the short pockets houses one ball.

2. The fixed constant velocity universal joint according to claim 1, wherein:
   the balls are formed along a pitch circle diameter that passes through a center of each of the balls;
   a pitch angle between a straight line formed on a plane of the pitch circle diameter and passing through an axial center of the fixed constant velocity universal joint and the center of a first of the two balls housed in each of the long pockets and a straight line formed on the plane and passing through the axial center and the center of a second of the two balls housed in each of the long pockets, respectively, is less than 60 degrees; and
   a pitch angle between a straight line formed on the plane and passing through the axial center and the center of the ball housed in each of the short pockets and a straight line formed on the plane and passing through the axial center and the center of an adjacent one of the two balls housed in one of the long pockets is greater than 60 degrees.

3. The fixed constant velocity universal joint according to claim 2, wherein:
   an axial direction length of the inward component is shorter than a circumferential direction spacing of the long pockets.

4. The fixed constant velocity universal joint according to claim 2, wherein:
   a shoulder width dimension between two track grooves on the outward component corresponding with the long pockets of the cage is set smaller than a pocket width in a cage axial direction.

5. The fixed constant velocity universal joint according to claim 2, wherein:
   a center of curvature of the track grooves on the outward component and a center of curvature of the track grooves on the inward component are each offset by a first offset amount k from a joint center in opposite axial directions, and a center of curvature of an outer spherical surface of the cage and a center of curvature of an inner spherical surface of the cage are each offset by a second offset amount k2 from the joint center in opposite axial directions; and
   a relationship between the first offset amount k and the second offset amount k2 is defined by the following expression:

$$(k-k2)/k<0.3.$$

6. The fixed constant velocity universal joint according to claim 2, wherein:
   each of the track grooves on the inward component and on the outward component includes an arc section and a straight section.

7. The fixed constant velocity universal joint according to claim 2, wherein:
   each of the track grooves on the inward component and on the outward component includes an arc section and a tapered section.

8. The fixed constant velocity universal joint according to claim 1, wherein:
   an axial direction length of the inward component is shorter than a circumferential direction spacing of the long pockets.

9. The fixed constant velocity universal joint according to claim 8, wherein:
   a shoulder width dimension between two track grooves on the outward component corresponding with the long pockets of the cage is set smaller than a pocket width in a cage axial direction.

10. The fixed constant velocity universal joint according to claim 8, wherein:
    a center of curvature of the track grooves on the outward component and a center of curvature of the track grooves on the inward component are each offset by a first offset amount k from a joint center in opposite axial directions, and a center of curvature of an outer spherical surface of the cage and a center of curvature of an inner spherical surface of the cage are each offset by a second offset amount k2 from the joint center in opposite axial directions; and
    a relationship between the first offset amount k and the second offset amount k2 is defined by the following expression:

$$(k-k2)/k<0.3.$$

11. The fixed constant velocity universal joint according to claim 8, wherein:
    each of the track grooves on the inward component and on the outward component includes an arc section and a straight section.

12. The fixed constant velocity universal joint according to claim 8, wherein:
    each of the track grooves on the inward component and on the outward component includes an arc section and a tapered section.

13. The fixed constant velocity universal joint according to claim 1, wherein:
    a shoulder width dimension between two track grooves on the outward component corresponding with the long pockets of the cage is set smaller than a pocket width in a cage axial direction.

14. The fixed constant velocity universal joint according to claim 13, wherein:

a center of curvature of the track grooves on the outward component and a center of curvature of the track grooves on the inward component are each offset by a first offset amount k from a joint center in opposite axial directions, and a center of curvature of an outer spherical surface of the cage and a center of curvature of an inner spherical surface of the cage are each offset by a second offset amount k2 from the joint center in opposite axial directions; and a relationship between the first offset amount k and the second offset amount k2 is defined by the following expression:

(k-k2)/k<0.3.

15. The fixed constant velocity universal joint according to claim 13, wherein:

each of the track grooves on the inward component and on the outward component includes an arc section and a straight section.

16. The fixed constant velocity universal joint according to claim 13, wherein:

each of the track grooves on the inward component and on the outward component includes an arc section and a tapered section.

17. The fixed constant velocity universal joint according to claim 1, wherein:

a center of curvature of the track grooves on the outward component and a center of curvature of the track grooves on the inward component are each offset by a first offset amount k from a joint center in opposite axial directions, and a center of curvature of an outer spherical surface of the cage and a center of curvature of an inner spherical surface of the cage are each offset by a second offset amount k2 from the joint center in opposite axial directions; and a relationship between the first offset amount k and the second offset amount k2 is defined by the following expression:

(k-k2)/k<0.3.

18. The fixed constant velocity universal joint according to claim 17, wherein:

each of the track grooves on the inward component and on the outward component includes an arc section and a straight section.

19. The fixed constant velocity universal joint according to claim 1, wherein:

each of the track grooves on the inward component and on the outward component includes an arc section and a straight section.

20. The fixed constant velocity universal joint according to claim 1, wherein:

each of the track grooves on the inward component and on the outward component includes an arc section and a tapered section.

* * * * *